United States Patent Office 3,066,033

Patented Nov. 27, 1962

3,066,033

CELLULOSE ESTER COATING COMPOSITION

Walter Leighton Clark III, Ramsey, N.J., assignor to American Cyanamid Company, New York, N.Y., a corporation of Maine No Drawing. Filed July 29, 1960, Ser. No. 46,101
13 Claims. (Cl. 106—169)

The present invention is concerned with forming protective coatings, particularly for foodstuffs, and with a novel product therefor. More specifically, the present invention provides novel thermoplastic compositions that may be readily coated on material to be protected, forming thereon a smooth, strong, cohesive, tightly-adherent, easily-peeled protective coating.

There is a growing demand for suitable compositions to be used as protective coatings on various materials, including foodstuffs. Such a coating should be smooth, non-sticky, non-tacky, and non-greasy. It should be capable of being readily applied and removed without substantial effect on the material coated. It should be a uniformly strong and cohesive film, highly impermeable to transmission of air and moisture, but it should not be readily adherent to other materials and therefore readily removed by stripping. It should be substantially transparent over a wide temperature range and remain pliable at refrigeration temperatures as low as −40° F. It should be capable of application by ordinary methods such as dipping, enrobing, liquid falling film and, if possible, hot-spraying.

In the past, numerous compositions have been proposed for, and used as, food coatings. Several such compositions have even achieved considerable commercial acceptance. However, none have been wholly satisfactory. All have been deficient in one or more of such properties as strength, impermeability, color, greasiness, stability, or stripability. Protective films of sufficient strength were usually difficult to remove from the coated object. Moreover, as the film strength was increased, the translucent properties disappeared and the film became opaque.

In U.S. Patent No. 2,893,875 to Chamberlain there is disclosed the preparation and properties of adducts obtained by combining, in aqueous media, long-chain fatty acids, an alkali metal and epichlorohydrin. As set forth in this patent, these adducts are suitable for use as food coatings since films formed therewith are strong and flexible but easily-peeled.

The present invention is based upon the discovery that compositions comprising a suitable adduct as described in the Chamberlain patent having dissolved therein up to about 45% by weight of a suitable esterified cellulose derivative are capable of providing even more excellent coating films. These novel compositions of the present invention are thermoplastic and may be spray-coated or applied as a liquid falling film on perishable foodstuffs without damage to the latter. These novel compositions produce films which are substantially transparent in thicknesses of 0.32 mm. or more, and which have a minimum bursting strength at least equivalent to about 300 g./sq. cm. at about 0.32 mm. thickness.

As to the choice of a cellulose ester, those which are ordinarily to be preferred are of the cellulose acetate-butyrate type. These are commercially available in widely differing degrees of substitution. On a weight percent basis, the following constituent ranges:

| | |
|---|---|
| Acetyl | 6–32 |
| Butyryl | 15–50 |
| Hydroxyl | 0.5–2.5 |

have been found useful in the present invention. However, within this range, the more desirable materials usually are found in a smaller group containing some 10–25% acetyl, 25–45% butyryl, and about 1.0–2.2% hydroxyl. Although the cellulose acetate-butyrates are preferred, the butyrate group may be replaced by others such as propionate, isobutyrate, amylate, and the like. In general, it is preferred that this group contain about 3 to 6 carbon atoms. However, useful coatings may be made wherein this group is as large as 16 to 18 carbon atoms, cellulose acetate stearate, for example. The invention is not limited to the use of a single cellulose ester and mixtures are equally useful if the average falls within the indicated limits.

In selecting a cellulose ester, not only is the degree of substitution of substantial importance, but also the extent of polymerization. Commercially, this is usually indicated by a viscosity measurement. The ASTM Method (D–871–48) in which viscosity is measured by the time in seconds required for a specified ball to fall through a fixed distance at 25° C. in a 20% solution of the polymer in acetone is widely used for this purpose. Using this standard, cellulose ester polymers having a viscosity of from as little as about 0.25 to about 35 seconds may be used in the present invention. For the preferred cellulose esters discussed above as having from 10–25% acetyl content, viscosity readings in the range of about 10 to about 30 seconds generally are preferred.

Success in the present invention is due to the observance of several factors. Of definite importance is the selection of an adduct, as disclosed in the abovementioned Chamberlain patent, from among those in the correct but limited group containing a residue of a long-chain fatty acid. Secondly, a proper selection must be made from among the many available cellulose ester derivatives. Finally, they must be blended in the proper proportions. Although up to about 45% by weight of a suitable cellulose ester may be used in the novel compositions of the present invention, 15 to 35% of cellulose ester is preferred. Above about 45% by weight of cellulose ester in the compositions tends to make the resulting film become stiff, and at about 60% it will be very hard and not as peelable. In general, therefore, the range which includes the most useful compositions is up to about 45% by weight of a suitable cellulose ester, and the preferred range is from about 15 to about 35% by weight.

Preparation of the novel compositions of the present invention is easily accomplished. The adducts disclosed in the above-mentioned Chamberlain patent are wax-like materials of relatively low melting point. They are simply liquified and the cellulose ester derivative is dissolved therein.

Application of the novel compositions of the present invention is not limited to any particular method. The object to be protected may be coated by such known methods as, for example, by dipping, by enrobing, or by employing a falling or a projected film. The novel compositions of the present invention may also be applied by spraying in a volatile solvent or simply as a hot melt of the coating composition. The volatile solvent may be, for example, acetone, methanol, chloroform, ethyl acetate, methyl cyclohexanone, methylethyl ketone, nitroethane, 1-nitropropane, 1,1,1-trichloroethane, and the like and mixtures thereof.

Various pigments such as titanium dioxide or coloring materials such as F. D. & C. Lake Yellow No. 5 may be added to the solution or hot melt so as to produce a colored coating. Bactericidal agents such as chlortetracycline hydrochloride may also be added to the solution or hot melt so as to reduce the bacteria population on the surface of the object to be coated. Since bactericidal agents such as chlortetracycline hydrochloride are generally more soluble in the water content of the foodstuff to be coated than in the novel compositions of the present invention, the bactericidal agent tends to migrate from the film to the foodstuff coated with these novel compositions. Also, various anti-oxidants may be added to the solution or hot melt so as to provide long term stability to the films formed therewith. It is an advantage of the instant compositions that because of their particular physical properties, they are easily applied by hot-spraying or by the falling film process.

The invention will be illustrated in conjunction with the following specific examples.

EXAMPLE 1

To illustrate the use of the products of the present invention as protective coatings, a composition was prepared consisting of 80% by weight of chlorodiglycerol oleate (the adduct prepared from sodium oleate and epichlorohydrin) and 20% by weight of a cellulose ester. The cellulose ester employed was a cellulose acetate-butyrate having an acetyl:butyryl:hydroxyl ratio of about 13:37:1, and about a 20 second viscosity. Strips of sirloin beef (½ inch by ¼ inch by 1.5 inches) were dipped therein. Uniform coatings were readily obtained. No appreciable loss in weight occurred after refrigerated storage for several weeks. Uncoated samples showed very appreciable losses during the same period. The coatings were easily removed by stripping.

EXAMPLE 2

To illustrate the clarity of the products of the present invention, a sample of coating composition prepared according to Example 1 was used. A film of 0.375 mm. thickness was cast on a sheet of wire-reinforced laminated plate glass. Using a "Photovolt Optical Densiotometer" without a filter, at Range Point 2, to measure the light transmission, an average of four readings showed no difference between the coated and uncoated portions of the glass.

EXAMPLE 3

To illustrate the effect on the burst strength of varying the ratio of the adduct to the cellulose ester of the novel compositions of the present invention, a group of four different samples was prepared as shown in Table I below. The adduct employed was chlorodiglycerol stearate (the adduct prepared from sodium stearate and epichlorohydrin). The cellulose ester employed was a cellulose acetate-butyrate having an acetyl:butyryl:hydroxyl ratio of about 13:37:1, and about a 20 second viscosity. The test films were cast on glass plates with a laboratory casting knife applicator adjusted for a 35 mil wet thickness. The final film thickness was 0.375 mm. and the test specimens were 2.5 inches in diameter. Burst strength was determined both in pounds per square inch and in grams per square centimeter. The results are shown below in Table I.

*Table I*

PHYSICAL PROPERTIES OF COATING FORMULATIONS

| Percent by weight of Chloro-diglycerol Stearate | Percent by weight of Cellulose Ester | Burst Strength, 25° C., 0.375 mm. thickness | | Remarks |
|---|---|---|---|---|
| | | p.s.i. | g./cm.² | |
| 100 | 0 | 3.9 | 274 | Slightly brittle at 3-4° C. |
| 95 | 5 | 7.2 | 506 | Do. |
| 90 | 10 | 12.1 | 851 | Flexible at 3-4° C. |
| 85 | 15 | 16.0 | 1,125 | Do. |

EXAMPLE 4

To illustrate the impermeability of the films prepared from the novel compositions of the present invention, a sample was prepared consisting of 85% by weight of chlorodiglycerol stearate and 15% by weight of a cellulose acetate-butyrate. The cellulose acetate-butyrate employed had an acetyl:butyryl:hydroxyl ratio of about 13:37:1, and about a 20 second viscosity. A test film was cast on a glass plate wtih a laboratory casting knife applicator adjusted for a 35 mil wet thickness. The final film thickness was 0.375 mm. and the test specimen was 2.5 inches in diameter. The specific permeability is defined as the number of miligrams of water which has permeated through one square centimeter of film 1.0 mm. thick in 24 hours under specified conditions of temperature and vapor pressure differential. The specific permeability of the test film was determined using standard Payne permeability cups and was found to be 1.43.

The coating compositions of this invention have been particularly noted as being excellent for preservation and/or protection of foodstuffs. However, the same physical properties which make them advantageous for that purpose also make them excellent for protecting other materials such as wood, rubber, metal and the like for long periods from adverse effects of air, moisture, dirt, and the like.

Although burst strength and other critical data have been principally presented for films of about 0.375 mm. thickness, this is not intended as a limitation. Films of both lesser and greater thickness are easily formed. The optimum thickness of coating chosen in actual use may be varied at will to suit the user's requirements for a particular purpose.

What is claimed is:

1. A coating composition consisting essentially of: from about 55 to about 95 parts by weight of an adduct obtained by combining, in aqueous media, at least about three mol parts of epihchlorohydrin and one mol part of an alkali metal soap of a long chain fatty acid containing at least nine carbon atoms; and from about 5 to about 45 parts by weight of a cellulose ester component having a hydroxyl content of from about 0.5% to about 2.5%, an acetyl content of from about 6% to about 32%, and from about 15% to about 50% of an aliphatic acyl radical of from three to about eighteen carbon atoms.

2. A coating composition according to claim 1 in which the alkali metal soap of a long chain fatty acid is sodium stearate.

3. A coating composition according to claim 1 in which the alkali metal soap of a long chain fatty acid is sodium palmitate.

4. A coating composition according to claim 1 in which the alkali metal soap of a long chain fatty acid is sodium oleate.

5. A coating composition according to claim 1 in which the alkali metal soap of a long chain fatty acid is potassium arachidate.

6. A coating composition according to claim 1 in which the alkali metal soap of a long chain fatty acid is potassium behenate.

7. A coating composition according to claim 1 in which the cellulose ester is a cellulose acetate butyrate.

8. A coating composition according to claim 7 in which the cellulose ester has an acetyl content of from about 10% to about 25%, a butyryl content of from about 25% to about 45%, and a hydroxyl content of from about 1.0% to about 2.2%.

9. A coating composition according to claim 1 characterized in that said composition has a softening point below about 90° C.

10. A coating composition according to claim 1 characterized in that a film of said composition has a bursting strength of at least 300 gm./sq. cm. at a film thickness of about 0.32 mm.

11. A process of preparing a coating composition which comprises dissolving in from about 55 to about 95 parts by weight of a liquified adduct obtained by combining, in aqueous media at least about three mol parts of epichlorohydrin and one mol part of an alkali metal soap of a long chain fatty acid containing at least nine carbon atoms, from about 5 to about 45 parts by weight of a cellulose ester component having a hydroxyl content of from about 0.5% to about 2.5%, an acetyl content of from about 6% to about 32%, and from about 15% to about 50% of an aliphatic acyl radical of from three to about eighteen carbon atoms.

12. A method of preparing a coated article which comprises forming a composition according to claim 1, at a temperature at which said composition is completely liquified, covering said article with said liquified composition, and cooling the so-covered article to a temperature at which the coating solidifies.

13. A coated article prepared according to claim 12.

References Cited in the file of this patent

UNITED STATES PATENTS

| | | |
|---|---|---|
| 2,868,656 | Patten et al. | Jan. 13, 1959 |
| 2,881,085 | Endicott et al. | Apr. 7, 1959 |
| 2,893,875 | Chamberlain | July 7, 1959 |